June 15, 1937.  H. E. MORTON  2,084,061

KEYWAY FORMING MACHINE

Filed Feb. 21, 1935  5 Sheets-Sheet 1

INVENTOR

Henry E. Morton,

BY

ATTORNEYS

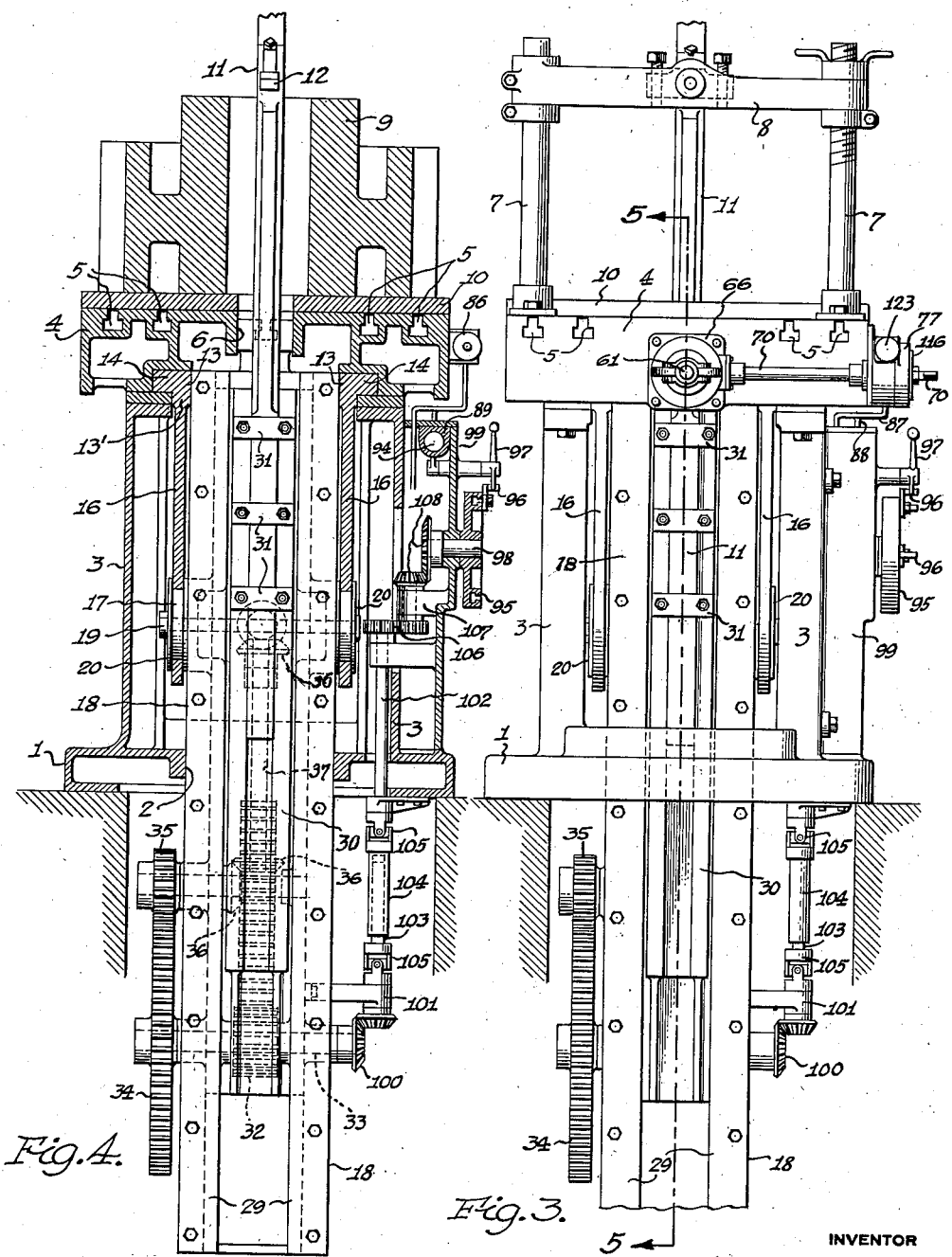

June 15, 1937.   H. E. MORTON   2,084,061
KEYWAY FORMING MACHINE
Filed Feb. 21, 1935   5 Sheets-Sheet 4
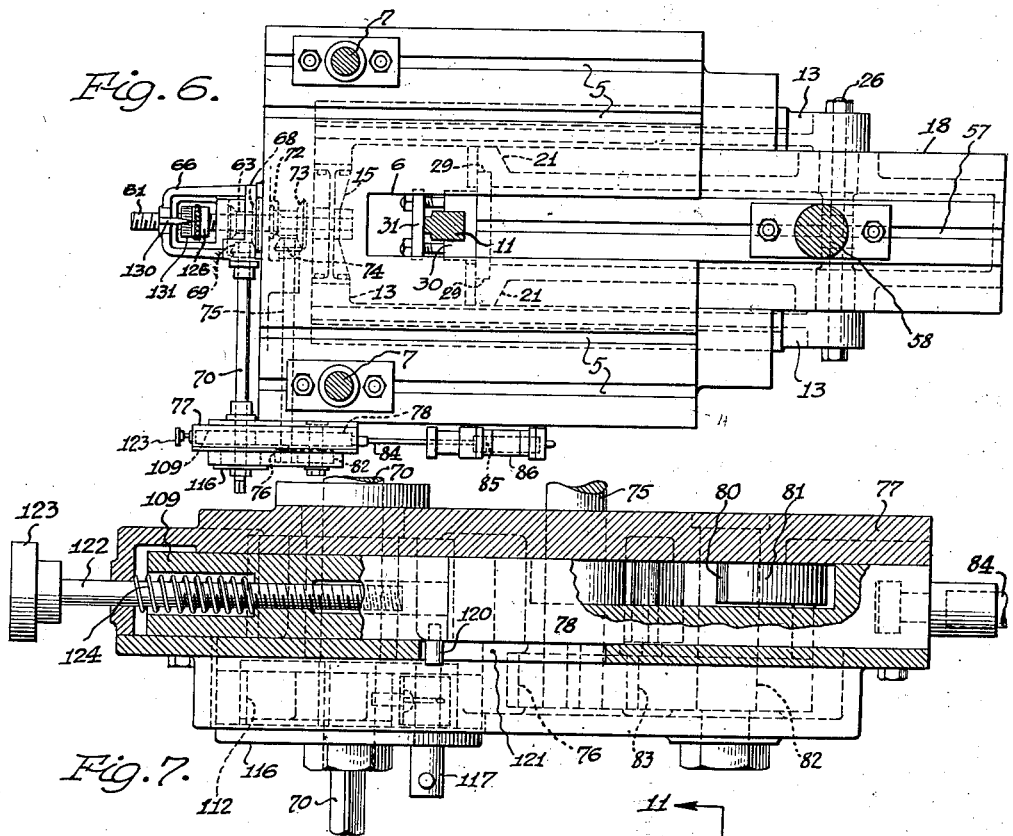
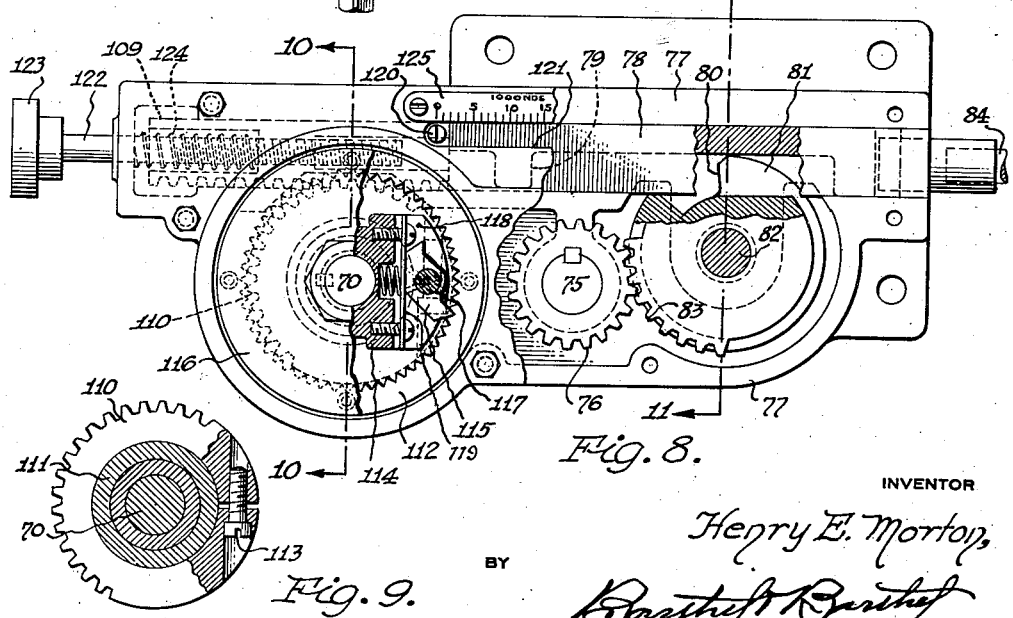
INVENTOR
Henry E. Morton,
BY
ATTORNEYS

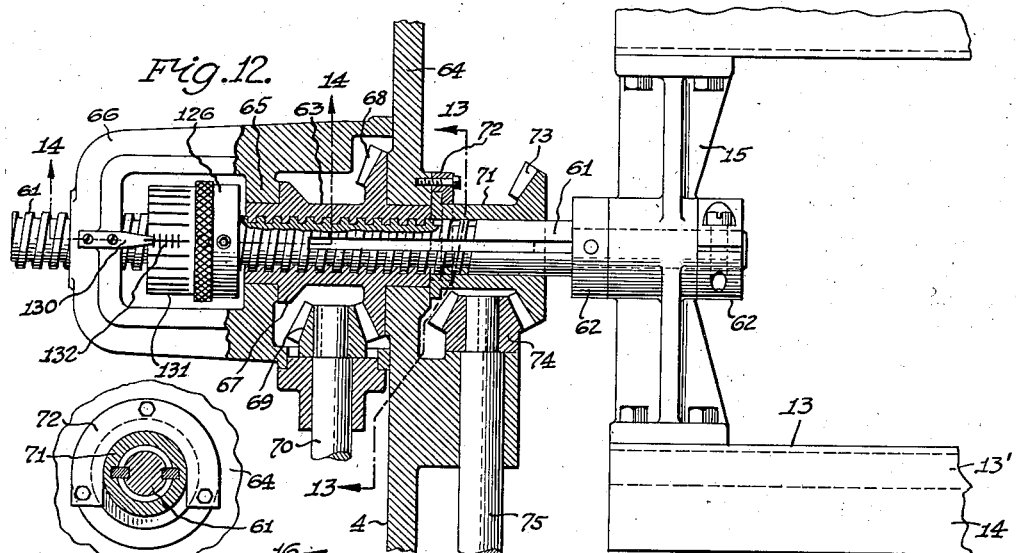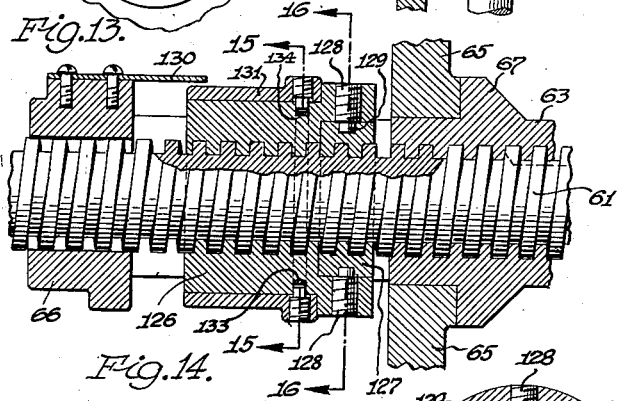

Patented June 15, 1937

2,084,061

UNITED STATES PATENT OFFICE 2,084,061

KEYWAY FORMING MACHINE

Henry E. Morton, Muskegon Heights, Mich.

Application February 21, 1935, Serial No. 7,534

24 Claims. (Cl. 90—43)

This invention relates to machines for forming key ways in the bores of hubs or other parts of machines or parts; and an object of the present invention is to provide, in a machine having a tool carrying bar or ram for reciprocation through a bore, an arrangement whereby such bar may be moved bodily in a lateral direction within such bore, at each end of the reciprocating stroke of said bar, to advance and retract the tool carried thereby, toward and from the work, and whereby the connection of power means to said bar for reciprocating the same, is maintained during such lateral movement of said bar.

A further object is to provide, in such a machine, an arrangement whereby said bar may be adjusted to an angular position relative to its lateral feeding movement and the connection of said power means to said bar for reciprocating the same, maintained; and, further to provide power means for effecting lateral advancing and retracting movement of said bar together with means operated in timed relation thereto to give an increment of advance movement to said bar for each working stroke of the same.

It is also an object to provide such advancing and retracting means with means for accurately regulating the depth of each cut of each stroke of the bar and means in the form of an adjustable stop to limit the depth of the complete keyway formed in the work, such advancing means including friction driving means adapted to slip when said stop becomes operative; and a further object is to provide a machine for the purpose which is completely automatic in its operation, is adapted to handle heavy work and is constructed to facilitate the setting of the machine for each particular job and for forming tapered keyways and keyways in tapered bores.

With the above and other ends in view, the invention consists in the matters hereinafter set forth and more particularly pointed out in the appended claims, reference being had to the accompanying drawings in which Figure 1 is a side elevation of a machine illustrative of an embodiment of the invention and showing parts broken away and in section;

Fig. 3 is a side elevation of the machine taken at right angles to that of Fig. 1;

Fig. 4 is a transverse vertical section substantially upon the line 4—4 of Fig. 1;

Fig. 6 is a plan view of the upper end of the machine with parts in section;

Fig. 7 is an enlarged detail of driving and control mechanism for effecting lateral feeding movement of the tool bar, and showing the same in upper side elevation with portions broken away and in section;

Fig. 8 is a side elevation of Fig. 7 with portions broken away and in section;

Fig. 9 is a sectional detail of a friction drive ring gear forming a part of the mechanism shown in Fig. 10;

Fig. 10 is a sectional detail on the line 10—10 of Fig. 8;

Fig. 11 is a transverse section on the line 11—11 of Fig. 8;

Fig. 12 is an enlarged sectional detail upon the line 12—12 of Fig. 5;

Fig. 13 is a section substantially upon the line 13—13 of Fig. 12;

Fig. 14 is an enlarged longitudinal section upon the line 14—14 of Fig. 12;

Fig. 15 is a transverse section upon the line 15—15 of Fig. 14;

Fig. 16 is a transverse section on the line 16—16 of Fig. 14;

Figures 1, 2:
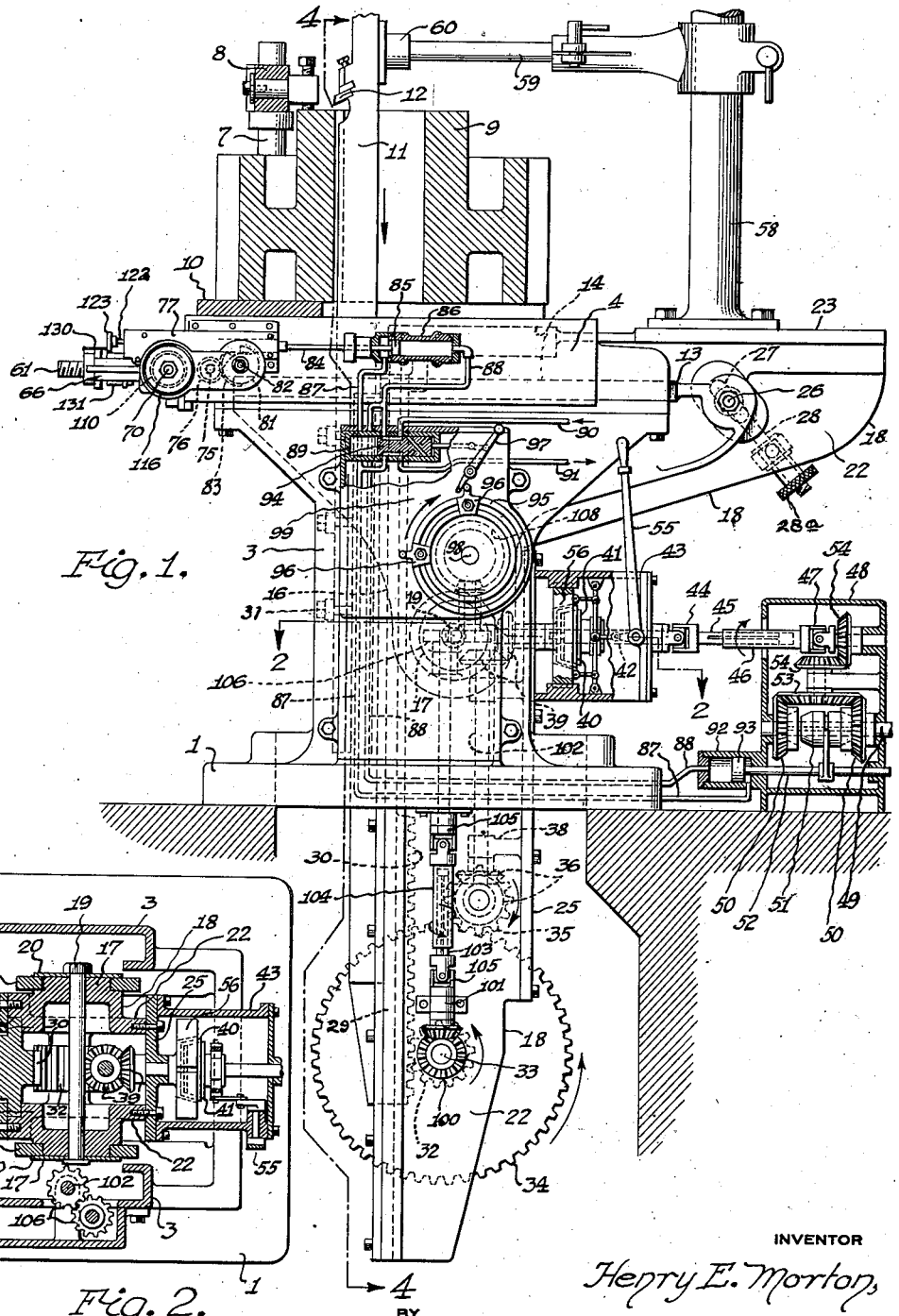
Fig. 2 is a transverse section substantially upon the line 2—2 of Fig. 1.
Figure 5:
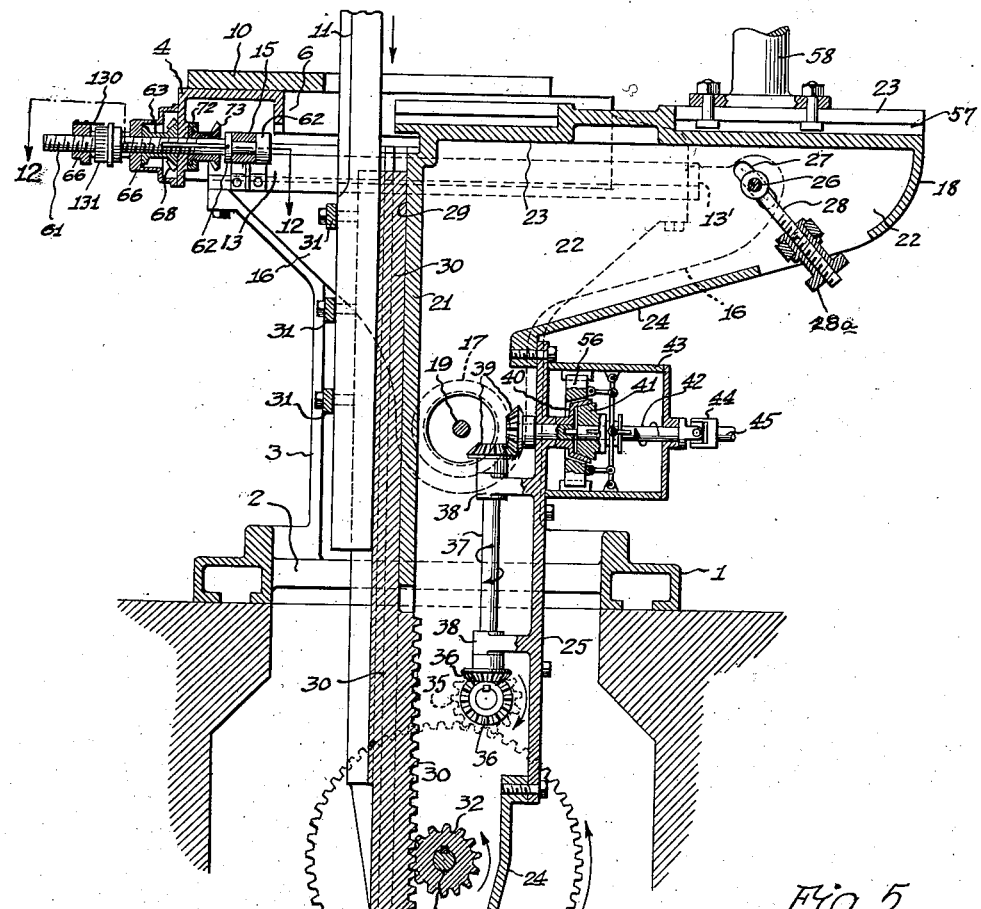
Fig. 5 is a longitudinal, vertical section substantially upon the line 5—5 of Fig. 3.

As shown in the drawings, a supporting frame or pedestal is formed with a base 1 to rest upon a floor or foundation having a well into which a portion of the working parts of the machine extend through an opening 2 in said base, said pedestal including upwardly extending side frames 3 on the base at each side of said opening therein and upon the upper ends of which frames is secured a work supporting table 4, this table being formed with longitudinal parallel undercut grooves 5 at each side of a central longitudinal slot 6 opening through the rear end of said table, said grooves being adapted to receive the heads of bolts for adjustably securing upright anchoring standards or posts 7 to said table, said posts being connected by a cross bar 8 adapted to extend across and over the work 9, such as the larger, heavy gear shown, or any other piece of work having a bore in one side of the wall of which it is desired to form a key way or slot, said bore 8 being provided with any suitable means for clamping the work down upon said table or upon a plate 10, as shown, laid upon the table to strengthen the same for very heavy work, said plate being also formed with a central slot to correspond with the slot 6 in said table and over which slots the work is centered and held with its bore in proper position thereabove to receive a tool bar 11 provided with a cutting tool 12 projecting from the forward side edge of said bar and detachably held seated therein in any suitable manner so that upon longitudinal reciprocation and lateral feeding movement of said bar within said bore, said tool will be operated to make a draw-cut during each down stroke of said bar and said bar will be moved laterally after each cut to clear the tool from the work and then moved laterally in an opposite direction at the upper end of each stroke to advance the tool for each succeeding cut, mechanism hereinafter described being provided for so moving said bar.

To impart such lateral movement to said bar 11, an open, horizontally reciprocable carrying slide or frame indicated as a whole by the numeral 13, is provided, said frame comprising side spaced apart longitudinal members 13' each formed with an outwardly projecting side rib or flange 14 to engage and slide within suitable horizontal ways provided at the lower side of the table 4, said side members 13' of said sliding frame being connected at their forward ends, by a cross bar 15, and each is provided with a downwardly extending arm 16, which arms extend downwardly adjacent the inner sides of the supporting frames 3 to nearly the lower ends thereof where each arm is formed to receive a bearing or trunnion 17 on a carrier casing indicated as a whole by the numeral 18, said carrier being thus pivotally supported between said side arms 16 for limited fore and aft swinging movement upon said reciprocable sliding frame 13 for the purpose of adjusting said carrier upon said trunnions relative to said slide, said arms 16 being connected by a through bolt 19 in the axes of said trunnions and having heads or nuts on its outer ends engaging caps or disks 20 on the outer ends of said bolt to hold said disks in engagement with the outer ends of the trunnions and the outer sides of said arms.

This carrier 18 is of hollow box-like construction with a front end wall 21, side walls 22 which are formed with the outwardly projecting trunnions 17, an integral top wall 23, and a rear wall 24 formed with an opening closed by a detachable plate 25. Said top wall 23 is extended a considerable distance beyond the rear ends of the side members 13' of said slide 13 and the side walls 22 and back wall 24 are extended rearwardly to meet said extended top wall, means being provided within this rearward extension for swinging said carrier upon said trunnions and holding the same in such adjusted position relative to said sliding frame 13 upon which it is mounted, said means comprising a bolt or shaft 26 mounted at its ends in rearward extensions or ears on the side members 13' of said frame and extending through slots or openings 27 in the side walls 22, an adjusting screw 28 being pivotally attached at one end to said shaft 26 between the walls 22 with its screwthreaded portion extending through a nut 28a pivotally anchored between said walls opposite an opening in the rear wall 24 to give access to said nut so that it may be turned to exert a pull or push on said shaft 26 and thus tilt the entire carrier 18 upon its pivotal support upon the lower ends of the arms 16 depending from the members 13' of the horizontally reciprocable frame 13.

Extending parallel with the front wall 21 of the carrier 18, integral therewith and from the upper to the lower end of the carrier, are ways 29 for a rack bar 30 to the upper end portion of which bar, the lower end portion of said tool bar 11 is secured by clamps 31, so that said tool bar will be reciprocated by longitudinal reciprocation of said rack bar in said ways upon said carrier, said rack bar being so reciprocated by engagement of the teeth thereof by a pinion 32 on a transverse shaft 33 mounted in bearings on the side walls 22 of said carrier casing 18 adjacent the lower end of a downwardly extended end portion of said carrier and which end portion extends downwardly through said opening 2 in the base 1 and into the well therebeneath, said end portion thus providing ways of extended length for the rack and tool bars and a rigid support therefor. Power means is mounted solely upon said carrier casing for driving said pinion 32 and thus reciprocating said rack and tool bars, said power means comprising a large gear 34 secured upon the outer end of said shaft 33 and meshing with a small gear 35 on the outer end of a stub shaft mounted in a bearing on one side wall 22 of the carrier casing and extending therethrough with a bevel gear 36 on its inner end within the casing in mesh with a like bevel gear on the lower end of a shaft 37 mounted in brackets 38 projecting inwardly from the inner side of the closure plate 25, and secured upon the upper end of said shaft is a bevel gear 39 in mesh with a like bevel gear on the inner end of a short shaft mounted in a bearing on the plate 25 and extending therethrough with the cup 40 of a clutch device on the outer end thereof to be engaged by a cone 41 splined upon an aligned shaft 42 mounted in and extending through a bearing on the outer end wall of a small casing 43 secured to said plate 25, said shaft 42 being coupled at its outer end by a universal joint 44 to a power input shaft 45 which, in turn, includes as shown in Fig. 1, a slip joint 46 and a second universal joint 47 for coupling it to a stub shaft mounted within a fixed casing 48 mounted independently of the machine and within which casing is mounted a transverse driving shaft 49 from which power is transmitted to drive the input shaft 45 by opposed bevel gears 50 loosely mounted on said drive shaft with an interposed double friction clutch member 51 splined on said shaft to be moved by a shifting rod 52 into engagement with the cupped hub of either one or the other of said gears 50 and transmit motion from shaft 49 in either direction through one or the other of said gears 50 and a large bevel gear 53 in mesh with both of said opposed gears, to a pair of meshing bevel gears 54, one of which is secured upon said stub shaft to which the shaft 45 is connected by the joint 47.

Figures 17, 18:
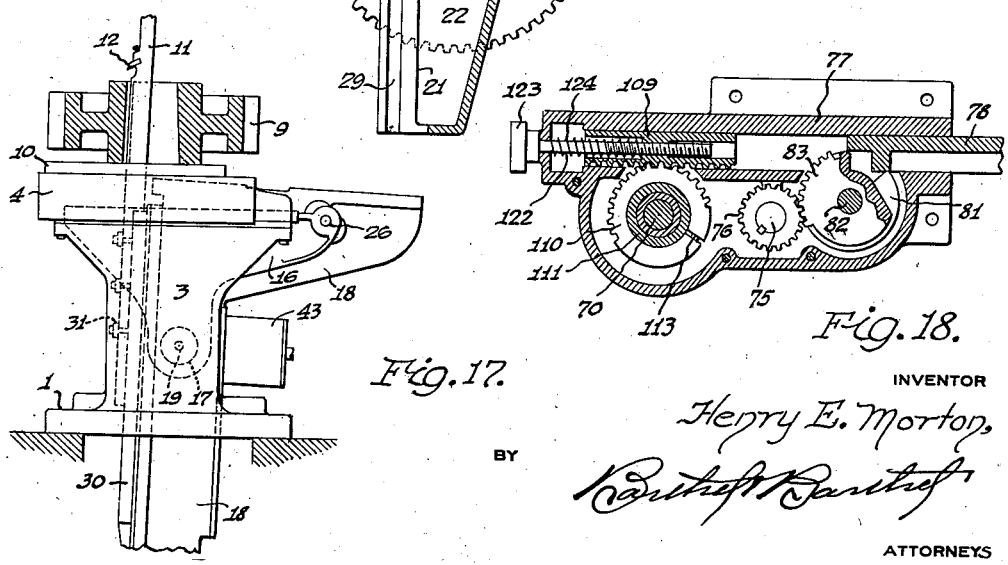
Fig. 17 is an outline view of the machine drawn to a reduced scale from that of Fig. 1 and showing said machine adjusted to form a keyway in a tapered bore.
Fig. 18 is a longitudinal section of Fig. 7, drawn to a reduced scale and showing the parts at the opposite end of their movement from that shown in Fig. 8.

With this arrangement of power means for reciprocating the rack bar 30 and tool bar 11, the horizontally movable sliding frame 13 which carries, through the medium of the arms 16 on said slide, the said carrier 18 for said bars, may be reciprocated without interfering with the continuous application of power to reciprocate the tool carrying bar 11, and the said carrier may be adjusted or rocked to the desired position relative to said frame, to set said tool bar at an inclination to the vertical, for the purpose of cutting a keyway in a tapering bore, as illustrated in Fig. 17, and this also without interfering with the continuous application of power to reciprocate said tool bar, this being due to the fact that the means for transmitting power from an outside source, is carried by the carrier, and that power is transmitted to such means, through a shaft embodying universal joints to provide for angular adjustment of said carrier, and a slip joint in said shaft which will provide for horizontal reciprocation of said slide and carrier to feed the tool bar toward and from the work.

To stop the machine without stopping the drive shaft 49, the said clutch within the casing 43 is provided, and this clutch is operated by a hand lever 55 on said casing, operatively connected to said clutch member 41 by any suitable means for moving said member longitudinally upon its shaft into and out of engagement with the member 49; and to stop the machine after said member 41 is withdrawn, and to hold the rack and tool bars against being further moved by the action of gravity, a friction brake ring 56 is mounted in the casing 43 in a position to encircle the cup member 40 of said clutch, said clutch member being of external conical form and said ring being of like internal form, so that by moving said ring longitudinally of said casing with which it is slidingly engaged and held thereby against rotation, braking force will be applied to said cup to stop movement of the gears 39 and the working parts of the machine, and also to hold said rack and tool bars in the position in which they are stopped and against the action of gravity, said brake ring being operatively connected with said hand lever 55 to be moved thereby into operative position whenever said clutch member 41 is moved by said lever into inoperative position.

The top wall 23 of the carrier 18 is formed with a central, longitudinal, undercut groove 57 to receive the heads of bolts for adjustably securing a post 58 to said carrier, and adjustably secured in any suitable manner to said post, is an arm 59 having a head 60 at its free end to engage the rear side face of said tool bar 11, said bar sliding in contact with said head during reciprocation of the bar, said head, arm and post thus forming adjustable means for bracing said bar against springing away from the work under the cutting strain of the cutting tool, said head being maintained in contact with said bar at all times during reciprocation of the slide frame 13 or pivotal adjustment of said carrier 18 thereon, due to the fact that both tool bar and post 58 are mounted on the carrier and move with it, the distance between bar and post remaining the same at all times after proper adjustment of arm and post relative to said bar.

The frame 13 is reciprocated a limited distance in timed relation to the reciprocation of the tool bar 11, to move said bar laterally and advance the cutting tool 12 carried thereby, toward the work at the upper end of the stroke of the bar and retract it at the lower end of the stroke to give clearance for the tool upon the upstroke. To effect such reciprocation of said frame, a screw shaft 61 is rotatively connected at one end to said end cross member 15 of said frame 13 by being passed through a bearing on said member with a collar 62 rigidly secured to said shaft at each end of said bearing (see Fig. 12), and this screw shaft is moved endwise in either direction by being extended through an internally screwthreaded nut 63 held against longitudinal movement between a depending wall 64 of the work table 4 and a transverse wall 65 of a bracket 66 secured to and projecting from the outer side of said wall 64, said nut having cylindrical end portions to engage and turn freely within openings in said walls and afford bearings for said nut and shaft, said nut being formed with a rib or collar 67 to engage the wall or cross member 65 of said bracket and with an integral bevel gear 68 having a flat side to engage the wall 64, said rib 67 and gear 68 thus preventing longitudinal movement of said nut but permitting free rotation thereof when driven by a small bevel gear 69 on the end of a shaft 70 mounted in a bearing on said bracket 66 and extending laterally therefrom to suitable means hereinafter described for turning said shaft. Splined upon said shaft 61 to impart rotation thereto, and located at the side of the wall 64, opposite that engaged by the gear 68, is a second nut 71 held against longitudinal movement by an end flange on said nut engaged within a grooved semicircular collar or stirrup 72 rigidly bolted to said wall 64, and at the opposite end, said nut is formed with a bevel gear 73 engaged by a smaller bevel gear 74 on the end of a shaft 75 mounted in a bearing on the inner side of said wall 64. Therefore when rotation is imparted to the shaft 75 in one direction, the screw shaft 61 will be rotated through the medium of the nut 71 which is splined on said shaft and this rotation of said shaft within the nuts 63 and 71 which are in screwthreaded engagement therewith, will move said shaft longitudinally in one direction, and through its connection with the frame 13, will move said frame in a like direction, said shaft and frame being moved in an opposite direction upon reversal of rotation of said shaft 75.

A limited rotation is imparted to said shaft 75 in both directions and in timed relation to the reciprocation of the tool bar, by mechanism operated hydraulically or by a fluid under pressure, said mechanism including a gear 76 secured upon the outer end of said shaft within a box or casing 77 secured to a side edge of the work table 4, said casing forming a longitudinal way in its upper part, for a slide 78 formed at its lower side with a lug 79 adapted to engage within a notch 80 in the periphery of a wheel 81 mounted upon a pin 82 extending transversely through said casing to turn freely thereon, said lug being adapted to pass into and then out of said notch as said slide is reciprocated over said wheel, and in so doing, turn said wheel a limited distance. Formed integral with the outer end of the hub of said wheel, is a gear segment 83 and this segment is adapted to engage the gear 76 on the end of shaft 75 and turn the same a limited distance in one or the other direction depending upon the direction of movement of said slide. Secured to the outer end of said slide 78, is a plunger rod 84 of a plunger 85 within a cylinder 86 (see Fig. 1) and air or other fluid pipes 87—88 open into the ends of said cylinder to supply fluid under pressure thereto for operating said plunger, a suitable slide control valve indicated as a whole by the numeral 89, being interposed in said pipe lines to control the flow into and from said cylinder 86 from a supply line 90 and into an exhaust line 91, pipes 87 and 88 being continued downwardly to the lower part of the casing 43 upon which is mounted a cylinder 92 into the opposite ends of which said pipes 87, 88 open, said cylinder having a piston 93 therein secured upon one end of the reversing-clutch shifting-rod 52. The sliding piston 94 of the control valve and the cylinder in which it reciprocates is formed with suitably arranged ports and passages so that the direction of flow through the pipes will be controlled to direct its flow into the cylinder 86 and move the slide 78 in the proper direction to rotate the shaft 75, to move the frame 13, and to advance the tool bar 11 when said bar is at the upper end of its stroke and retract the same when at the lower end of its stroke; reversal of movement of said bar being simultaneously effected by the control of flow, by said control valve, into the cylinder 92 in the proper direction to properly operate the clutch member 51 through the medium of the piston 93 and effect such reversal through the medium of said clutch operating to change the direction of rotation of the input shaft 45.

Said control valve 89 is operated in proper timed relation to the reciprocative movements of the said tool bar 11, by a control wheel 95 having tappets 96 adjustably secured thereto for adjustment along the periphery thereof, to engage and swing a control lever 97 which is operatively connected in any suitable manner to the piston rod of the piston 94 of the control valve 89 so that said valve will be operated by the engagement of either of said tappets with said lever to effect, through a change of fluid flow into said cylinder 92, a reversal of the direction of movement of said tool bar, and therefore the length of stroke of said bar is determined by the distance apart at which said tappets are set, said wheel 95 being rotated in timed relation to the reciprocation of said tool bar, by being mounted upon the outer end of a stub shaft 98 (see Fig. 4) which is mounted in a suitable bearing on the outer wall of a box or case 99 secured to the outer side of one of the side supporting frames 3, motion being transmitted to rotate said wheel 95, from the said shaft 33 to which the gear 32 for reciprocating the rack bar, is secured, said motion transmitting means comprising a bevel gear 100 on the laterally projecting end of said shaft 33, in mesh with a like bevel gear on a short shaft mounted in a bearing on a bracket 101 projecting laterally from one side of the carrier casing 18 adjacent said shaft 33, and to transmit motion to a vertical shaft 102 extending upwardly through an opening in the base 1 of the machine, a shaft 103 provided with a slip joint 104, is connected at its ends by universal joints 105 to the upper end of said short shaft and the lower end of said shaft 102, this arrangement providing for the swinging adjustment of the carrier 18 and also its reciprocating feed movement with the slide frame 13. From the upper end of shaft 102, motion is transmitted laterally by spur gears 106 to a short shaft mounted in a bearing bracket 107 within the box or casing 99 and upon the upper end of which short shaft a small bevel gear is mounted for engagement with a larger bevel gear 108 on the inner end of shaft 98, on the outer end of which said wheel 95 is secured. Motion is therefore transmitted from the main shaft 33 driving the rack bar 30, for rotating the tappet or control wheel 95 in timed relation to the reciprocation of said bar, and this continues regardless of the position or movement of the carrier 18 and reciprocating frame 13, so that the lever 97 will be operated at each end of the stroke of the tool bar 11 to effect a reversal of the direction of movement of said bar through a shifting of the control valve 89.

This machine is designed so that several strokes of the tool bar and several succeeding cuts of the tool are necessary to form a keyway of the desired depth, and therefore, it becomes necessary to further advance the tool toward the work at the upper end of each stroke of said tool bar, to make the added increment of cut. The length of later feeding movements of the slide 13 which moves said bar 11 toward and from the work is always the same, but each time the bar completes an upstroke it is moved further toward the work to make the next cut and this further feed is secured through the turning of the nut 63 (see Fig. 12) relative to the screw shaft 61 with which it is in screwthreaded engagement, this turning of said nut being limited so that the screw shaft will be moved endwise to move the frame 13 just sufficiently to advance the cutting tool the exact distance for the next cut. This turning of said nut 63 is effected through the turning of the shaft 70 a regulated and accurately determined distance, through the abutting of the slide 78 with the inner end of a slide or rack bar 109 mounted in the box 77 for longitudinal reciprocation in a continuation of the way in which said slide 78 is reciprocable in said box, said rack bar 109 being formed with teeth along its lower side to engage a split ring gear segment 110 (see Fig. 10) encircling the hub portion 111 of a ratchet ring 112 and held in frictional driving contact with said hub by contacting said split segment upon said hub by means of a binding screw 113 (see Fig. 9) for drawing the split ends of said gear segment toward each other, said shaft 70 within said ratchet ring, having secured thereon, a head 114 carrying a pivoted pawl 115 to engage the interior teeth of said ratchet ring, said head being formed with a disk flange 116 at its outer end to close the outer end of said ratchet ring. Said pawl 115 is preferably a double pawl formed at each end to engage said ratchet teeth and pivoted intermediate its ends upon a pin 117 between an ear 118 on said head and said disk 116 therein, with the outer end of said pin 117 projecting through said disk so that it may be turned to adjust said pawl which is yieldingly held in adjusted position with one end engaged with said ratchet teeth, by a spring 119 arranged to press a plate or other suitable member against angularly arranged flat surfaces on the back side of the end portions of said pawl at each side of said pivot thereof and yieldingly hold said pawl with either one or the other of its ends engaged with said ratchet, the position of the pawl being such that in one direction of rotation of the gear segment 110 and ratchet ring 112, said pawl will engage the ratchet in a manner to rotate said head 114 and consequently the shaft 70 in the same direction in which said gear segment is rotated, but upon reversal of rotation of said segment and ratchet, said pawl will slip over the teeth of the ratchet and said shaft will not be rotated. Therefore when the slide 78 is moved to the position shown in Fig. 8, it will have actuated the notched wheel 81 and moved the frame 13 to the forward end of its stroke, and said slide having come into contact with the end of the sliding rack bar 109, will have, at the end of said stroke of said slide, moved said rack and through the pawl and ratchet connection of the ring segment gear 110 with said shaft 70, rotated said shaft and nut 63 in a direction to further advance said sliding frame 13 and consequently the tool bar, toward the work to cause the tool to make an additional cut upon the next downward stroke of the tool bar. With this arrangement, each time said sliding frame is moved toward the work, an increment is added to such movement and upon retraction of said frame, no increment is added to that movement, due to the pawl and ratchet, or one way drive between gear member 110 and shaft 70 and the amount of such increment of advance is accurately determined by the length of movement of the rack bar 109 when actuated by said slide 78 coming into contact therewith and moving said rack to the limit of its movement in that direction as determined by a stop pin 120 on said rack movable with said rack within a longitudinal slot 121 in a side wall of the box or casing 77.

The rack 109 is formed with a longitudinal bore, a portion of which bore is screwthreaded to receive an adjusting screw 122, the plain outer end portion of which passes through an opening in an end wall of said casing 77, said outer end of said screw being provided with a head 123 by means of which said screw may be turned, said head also forming a stop to engage said end wall of the casing, when said rack and screw are moved by a spring 124 sleeved upon said screw between said end wall and rack, when said slide 78 is moved out of contact with the end of said rack, the movement of said rack caused by said spring being limited by said head on said screw coming into contact with said end wall, and the length of this movement being accurately determined by screwing this screw in or out to permit said spring to move said rack a greater or lesser distance and thus determine the length of stroke of said rack and the degree of turning movement which will be imparted thereby to said shaft 70. To aid in such adjustment, a scale 125 is preferably provided upon the side wall of the casing 78 along the slot 121 therein, said scale indicating according to the position of the stop 12 relative thereto when the head 123 is in contact with the end of the casing, the length of the stroke of said rack and in thousandths of an inch, the depth of each cut.

To limit the longitudinal outward movement of the screw shaft 61 and thus limit the extreme movement of the slide 13 and tool bar 11 toward the work, thereby limiting the extreme depth of the keyway to be formed by successive cuts made by the tool, a cylindrical stop member 126 shown in Figs. 12 and 13, is adjustably secured to said shaft to turn therewith, within the bracket 66 between the outer end of said bracket forming a bearing through which said shaft extends, and the cross member 65 of said bracket with a space between the outer end of said stop member 126 and the said outer end of said bracket, so that when said screw shaft has been moved endwise by the successive increments of longitudinal movement imparted thereto by the automatic turning of said nut 63 thereon at the upper end of each stroke of the tool bar as previously described, and the keyway has been cut in the work to its desired depth, said stop member will abut said outer end of said bracket and stop further endwise movement of said shaft in an outward direction, thus automatically limiting the keyway to the desired depth. Should the machine be permitted to continue to run, upon the tool bar reaching the upper end of its next movement, the further turning of the nut 63 and movement of said shaft to set the tool bar to make another and further cut, will be positively stopped by said stop member 126, and some part of the machine would be broken were it not for the fact that the ring gear segment 110 is frictionally clamped to the hub 111 of the ratchet ring 112 and will, therefore slip, permitting said gear segment to be turned by power applied thereto by the said sliding rack 109 without turning the said ratchet ring. An accurate stop is thus provided to limit the depth of the keyway to the exact desired depth, and this stop member may be accurately adjusted to conform to any desired change in the depth of keyway, by loosening said stop member upon said shaft, turning it thereon to adjust it longitudinally of said shaft and then again securing it to said shaft to turn therewith.

This securing of said stop member to said shaft is facilitated by providing an internally screwthreaded split ring 127 on said shaft 61 within an end recess of said member and providing a series of radical set screws 128, one for each split portion of said ring so that by screwing these set screws inwardly, said portions will be forced into clamping frictional engagement with said shaft to securely hold said stop member in adjusted position, and to hold said member and split ring against relative turning, each set screw is formed with a reduced inner end 129 to engage a recess in the exterior of the split portion of the ring with which it engages, all as shown in Figs. 14 and 16.

To facilitate the accurate adjustment of the stop member 126 along the screw shaft 61 so that said member will function to accurately limit the depth of the keyway being formed, a fixed pointer 130 is secured to the bracket 66, to project over the forward end of a sleeve 131 rotatively mounted upon said stop member, said sleeve being provided with graduation marks 132 as shown in Fig. 12, comprising a series of lines extending transversely of a central line extending longitudinally of said sleeve so that the exact distance of the end of said stop member from the end of the bracket and the exact amount of endwise movement of said shaft before it will be stopped, will be indicated; and this sleeve is rotatively mounted upon said member so that if, in turning the stop member to adjust it upon the shaft, the member be left with the line of graduations out of alignment with said pointer, said sleeve may be turned upon said stop member to bring said graduations into alignment with said pointer and then the pointer will indicate on the graduations 132 the distance which the shaft may be moved before being stopped and the exact limit of the depth of the keyway in fractions of an inch. In order to frictionally hold said sleeve 131 against turning upon said stop member, said member is formed with an external groove 133 in which is laid a spring 134 of wave or distorted form (see Fig. 15) so that the humps or outwardly curved portions of said spring will bear against the inner surface of the sleeve and the inwardly curved portions against the bottom of said groove, and to hold the sleeve against endwise movement on said member, set screws 135 are provided on said sleeve to engage within said groove. By first loosening the stop member from said shaft and then reversing the pawl 115 by turning the pin 117 upon which said pawl is mounted, and by then starting the machine and holding said member against turning with said shaft, said member may be adjusted away from the end of said bracket to the exact desired position as indicated on said graduations by said pointer.

Having thus fully described my invention what I claim is:

1. In a machine for the purpose described, the combination of a rigid work support, a carrier member pivotally supported by said support and provided with ways, a tool bar movable longitudinally along said ways and having a cutting tool, means for adjusting said carrier upon its support to an angular position relative to said work support, and means mounted on said carrier and movable therewith for reciprocating said bar longitudinally.

2. In a machine for the purpose described, the combination of a rigid work-support provided with ways, a frame movable along said ways, a carrier member mounted in said frame for adjustment thereon and provided with ways, a tool bar longitudinally reciprocable along said ways on said carrier and provided with a cutting tool, means for adjusting said carrier to adjust said bar laterally to an angular position relative to said frame, means for reciprocating said bar longitudinally, and means for reciprocating said frame along said ways upon said work support to move said carrier and bar carried thereby, toward and from the work.

3. In a machine for the purpose described, the combination of a rigid work-support, a frame reciprocable upon said support, a carrier connected to and supported upon said frame by a single pivot upon which it is adapted to swing relative to said frame, a tool bar mounted upon said carrier for longitudinal reciprocation thereon, means for adjusting and holding said carrier in adjusted position upon its pivotal connection to said frame, means for reciprocating said frame, and means mounted on said carrier for reciprocating said bar.

4. In a machine of the character described, the combination of a rigid work support having an opening therein and adapted to support work having a bore with said bore aligned with said opening, a tool bar having a cutting tool, reciprocable longitudinally through said opening and bore, a carrier upon which said bar is mounted for longitudinal reciprocation thereon, said carrier being pivotally supported for swinging adjustment to adjust said bar to an angular position relative to the axis of said bore of the work, means for swinging said carrier and holding the same in adjusted position, and means on said carrier for reciprocating said bar longitudinally through the bore of the work.

5. In a machine of the character described, the combination of a rigid work-support provided with ways, a frame movable along said ways, a carrier member mounted in said frame for adjustment thereon and provided with ways, a tool bar longitudinally reciprocable along said ways on said carrier and provided with a cutting tool, means for adjusting said carrier to adjust said bar laterally to an angular position relative to said frame, means mounted upon said carrier for reciprocating said bar longitudinally, means for reciprocating said frame and said carrier and bar carried thereby toward and from the work intermittently, and in timed relation to the longitudinal reciprocation of said bar, and means for advancing said bar toward the work at one end of each stroke to effect a further increment of cut by said tool for each stroke of said bar.

6. In a machine of the character described, the combination of a rigid work-support provided with ways, a frame movable along said ways, a carrier member mounted in said frame for adjustment thereon and provided with ways, a tool bar longitudinally reciprocable along said ways on said carrier and provided with a cutting tool, means for adjusting said carrier to adjust said bar laterally to an angular position relative to said frame, means for reciprocating said bar longitudinally and including reversing means for reversing the direction of movement of said bar at each end of its stroke, and means for reciprocating said frame including means for operating said reversing means, whereby said frame is reciprocated to move said bar toward and from the work at the ends of the stroke of said bar.

7. A machine for forming keyways including a rigid supporting pedestal, a horizontally disposed work supporting table secured upon said pedestal and having an opening therein and longitudinal ways therebeneath, a frame reciprocable in said ways and having depending spaced apart side members, a carrier pivotally supported by said depending members and formed with ways at its forward side, a tool bar having a cutting tool and longitudinally reciprocable along said ways on said carrier, motion transmitting means mounted on said carrier for effecting reciprocation of said bar, means for rotating said carrier upon its pivoted support to adjust said bar to a limited inclined position in either direction from the vertical, and means supported independently of said carrier for reciprocating said frame to move said bar in the position in which it is held by said carrier, toward and from the work.

8. In a machine of the character described, the combination of a tool bar having a cutting tool, means for reciprocating said bar longitudinally, a reciprocable member for intermittently moving said bar and its tool laterally toward and from the work, means for imparting intermittent motion in first one and then the other direction to said reciprocable member, and means operated by said motion imparting means in moving said member toward the work, for moving said member an additional distance toward the work at one end of the longitudinal stroke of said bar to add an increment of cut for each stroke.

9. In a machine of the character described, the combination of a tool bar having a cutting tool, a reciprocable member for intermittently moving said bar and tool laterally toward and from the work, means for reciprocating said bar longitudinally and said member in timed relation to each other, and means operated in timed relation to the reciprocation of said member for moving said member an additional distance to advance said bar and tool toward the work at one end of the longitudinal stroke of said bar and add an increment of cut for each working stroke of said bar.

10. In a machine of the character described, the combination of a tool bar having a cutting tool, a reciprocable member for intermittently moving said bar and tool toward and from the work, means for reciprocating said bar longitudinally and said member in timed relation to each other, a carrier member mounted upon said member and upon which said bar is mounted for longitudinal reciprocation, means for adjusting said carrier to an angular position upon said reciprocable member to set said tool to cut angularly across the work, and means operated in timed relation to the reciprocation of said member for moving the same an additional distance toward the work at one end of each longitudinal stroke of said bar.

11. In a keyway forming machine, the combination of a rigid pedestal having a base provided with an opening for placement over a pit and upwardly extending spaced apart side members, a work supporting table secured upon the upper ends of said side members with ways beneath said table, a horizontally reciprocable frame mounted in said ways and provided with spaced apart arms extending downwardly therefrom, a carrier positioned between said arms and journaled upon the lower ends thereof with its upper end adjacent said table and its lower end portion extending into said pit through said opening in said base, said carrier having ways extending along its forward side throughout its length, a rack bar reciprocable in said ways, a tool bar having a cutting tool and detachably secured to said rack bar, means mounted on said carrier for reciprocating said rack bar, means for reciprocating said frame for moving said carrier and tool bar carried thereby, toward and from the work, and means for turning said carrier upon its trunnions to adjust said tool bar to an angular position relative to the vertical and hold the same in adjusted position while being reciprocated longitudinally.

12. In a machine of the character described, the combination of a tool bar having a cutting tool, means for reciprocating said bar longitudinally, a reciprocable member for reciprocating said bar to move the same toward and from the work, a screw shaft for reciprocating said member, a nut in screwthreaded engagement with said shaft and fixed against movement longitudinally of said shaft but free to rotate thereon, means for imparting rotation to said nut in alternate directions, and means operated in timed relation to the longitudinal reciprocation of said bar for changing the direction of rotation of said rotation imparting means at each end of the longitudinal stroke of said bar.

13. In a machine of the character described, the combination of a tool bar having a cutting tool, means for reciprocating said bar longitudinally, a reciprocable member for reciprocating said bar to move the same toward and from the work, a screw shaft for reciprocating said member, a nut in screwthreaded engagement with said shaft and fixed against movement longitudinally of said shaft but free to rotate thereon, means for imparting rotation to said nut in alternate directions, and in timed relation to the longitudinal reciprocation of said bar, and means operated in timed relation to said means for imparting alternate rotation to said shaft to impart additional longitudinal movement to said shaft in one direction only and at one end of each longitudinal reciprocation of said bar.

14. In a machine of the character described, the combination of a tool bar having a cutting tool, means for reciprocating said bar longitudinally, a reciprocable member for reciprocating said bar to move the same toward and from the work, a screw shaft for reciprocating said member, a nut in screwthreaded engagement with said shaft and fixed against movement longitudinally of said shaft free to rotate thereon, means for imparting rotation to said nut in alternate directions, a second nut in screwthreaded engagement with said shaft and fixed against movement longitudinally of said shaft, means for intermittently rotating said second nut in one direction only and in timed relation to the rotation of said first nut, and means operated in timed relation to the longitudinal reciprocation of said bar for changing the direction of rotation of said rotating means for said first named nut.

15. In a machine of the character described, the combination of a tool carrying member, means for reciprocating said member, and means for moving said member and tool toward and from the work, said last named means including a screw shaft, a pair of nuts having screwthreaded engagement with said shaft and each held against movement longitudinally of said shaft, means for imparting rotation to one of said nuts in first one and then in the other direction, said means being operated in timed relation to the reciprocation of said tool carrying member, means for imparting rotation in one direction only to the other of said nuts and which means is operated in timed relation to the said means for rotating the other nut in alternate directions, and stop means for limiting the longitudinal movement of said shaft.

16. In a machine as characterized in claim 15 and wherein said stop means comprises a member adjustably secured on said shaft to engage a fixed abutment and limit further movement of said shaft.

17. In a machine of the character described, the combination of a tool carrying member, means for reciprocating said member, and means for moving said member and tool toward and from the work, said last named means including a screw shaft, a pair of nuts having screwthreaded engagement with said shaft and each held against movement longitudinally of said shaft, a gear for rotating one of said nuts alternately in opposite directions, a ratchet drive for rotating the other of said nuts in one direction only, means for imparting rotation to said gear and ratchet drive including a pair of longitudinally aligned reciprocable members, one adapted to engage and actuate the other upon movement in one direction, and power actuated means for moving one of said reciprocable members alternately in opposite directions to turn one of said nuts alternately in opposite directions and to move the other reciprocable member in one direction and through said ratchet drive to turn the other of said nuts in one direction only, said means for reciprocating said tool carrying member including motion reversing means actuated by said power means in timed relation to the actuation of said reciprocable members.

18. A machine as characterized in claim 17, and including a spring for moving one of said pair of aligned reciprocable members toward the other, and adjustable means for limiting the movement of said member caused by said spring, to adjust the stroke of said member and the amount of turning movement of the said nut effected thereby.

19. A machine as characterized in claim 15, and wherein said stop means comprises an internally screwthreaded cylindrical member on said screw shaft, means for adjustably clamping said stop member on said shaft to turn therewith, and an indicating sleeve rotatably mounted on said stop member, and wherein said means for imparting rotation in one direction only to one of said nuts includes a longitudinally reciprocable rack bar engaging a gear and a pawl and ratchet for transmitting motion from said gear in one direction of rotation only.

20. In a machine for the purpose described, the combination of a supporting structure, a horizontally disposed work table on said structure, horizontal fixed ways beneath said table, a frame reciprocable in said ways and having downwardly extending side arms, a carrier comprising a casing pivotally supported by said arms adjacent the lower ends thereof and provided with ways extending the length of the forward side thereof, a rack bar reciprocable in said ways, means within said carrier casing for transmitting motion to reciprocate said rack bar, fixedly supported means outside said casing for transmitting power to drive said motion transmitting means within said casing, said outside means including reversing means to effect a reversal of motion of said rack bar at each end of its stroke, a tool bar attached to and movable with said rack bar, means for adjusting said carrier upon its pivotal support on said frame to tilt said carrier and rack and tool bars from the vertical, means for reciprocating said frame in timed relation to the longitudinal reciprocation of said rack and tool bars to move said bars toward and from the work, said last named means comprising a screw shaft connected at one end to said frame, a pair of nuts on said shaft each held against longitudinal movement and free to rotate, laterally extending shafts having geared connection with said nuts, a box casing into which said lateral shafts extend at their outer ends, a pair of longitudinally aligned slides mounted in a way in said box, a gear within said box on the end of one of said lateral shafts, a gear segment to engage said gear, a notched wheel to be engaged by a lug on one of said slides and rotate said gear segment, a gear loosely mounted upon the other lateral shaft within said box and engaged by rack teeth on the other of said slides, a pawl and ratchet for transmitting motion from said last named gear to said shaft in one direction of rotation only, adjustable means for limiting the movement of said last named slide toward the other slide to regulate the turning movement of said shaft, power means for moving said other slide longitudinally to effect movement of both slides and limited turning of said lateral shafts, said power means being effective to operate said reversing means for reversing the reciprocation of said tool bar at each end of its stroke, and means operated in timed relation to the reciprocation of said tool bar for reversing the reciprocation of said slide to which said power means is connected.

21. A machine as characterized in claim 20 and wherein said means for transmitting motion to reciprocate said rack bar includes a clutch and a brake, said brake being arranged to retard movement of said means and to hold the same and said rack bar against movement caused by gravity after the disconnection of said clutch.

22. In a machine for the purpose described, the combination of work supporting means for supporting work having a bore, a longitudinally reciprocable tool bar projectable through said bore, a cutting tool on said bar, means for moving said bar and tool laterally toward and from the wall of the bore of the work, and means for adjusting said bar laterally to an angular position relative to the axis of the bore of the work and into parallelism with the tapered wall of the bore, and means for reciprocating said bar longitudinally in timed relation to the lateral movement thereof while said bar is held in its angularly adjusted position.

23. In a machine for the purpose described, the combination with means for rigidly supporting work having a bore; of a tool bar for reciprocation longitudinally in said bore, a cutting tool on said bar projecting laterally therefrom, carrying means upon which said bar is mounted for longitudinal reciprocation thereon relative thereto, means for adjusting said carrying means to and holding the same in an angular position relative to the axis of said bore and parallel with the tapered wall of said bore, means for reciprocating said bar longitudinally, and means for moving said carrying means to move said bar laterally toward and from the wall of the bore in timed relation to its reciprocation.

24. In a machine of the character described, the combination with a fixed work support having an opening therethrough and for supporting work having a bore with said bore in alinement with said opening in said support, a tool bar adapted to be projected through said opening in said support and through said bore in said work, a cutting tool mounted upon said tool bar and projecting laterally therefrom, means upon which said bar is longitudinally reciprocable, said means being adjustable laterally to angular position relative to the longitudinal axis of said bore of the work, and means carried by said adjustable means and movable therewith for reciprocating said bar longitudinally.

HENRY E. MORTON.